(12) United States Patent
Keeler et al.

(10) Patent No.: US 12,370,861 B2
(45) Date of Patent: Jul. 29, 2025

(54) TORQUE ROD FOR VEHICLE SUSPENSION

(71) Applicant: Hendrickson USA, L.L.C., Schaumburg, IL (US)

(72) Inventors: Michael J. Keeler, Cape Coral, FL (US); Jeffrey R. Zawacki, Channahon, IL (US); Scott Allen Massa, Chicago, IL (US); Jason C. Fugitt, Downers Grove, IL (US); Matthew D. Kowalski, Naperville, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 17/897,526

(22) Filed: Aug. 29, 2022

(65) Prior Publication Data

US 2022/0402324 A1 Dec. 22, 2022

Related U.S. Application Data

(63) Continuation of application No. 15/168,936, filed on May 31, 2016, now abandoned.

(Continued)

(51) Int. Cl.
*B60G 21/055* (2006.01)
*B23P 15/00* (2006.01)
*B60G 7/00* (2006.01)

(52) U.S. Cl.
CPC .......... *B60G 21/0551* (2013.01); *B23P 15/00* (2013.01); *B60G 7/001* (2013.01);
(Continued)

(58) Field of Classification Search
CPC ...... B60G 3/06; B60G 7/001; B60G 2206/10; B60G 2206/11; B60G 2206/14;
(Continued)

(56) References Cited

U.S. PATENT DOCUMENTS

| 998,758 A | 7/1911 | Eichhorn |
|---|---|---|
| 1,839,680 A | 1/1932 | Hudson |

(Continued)

FOREIGN PATENT DOCUMENTS

| CN | 1482014 A | * | 3/2004 | ............. B60G 7/001 |
|---|---|---|---|---|
| EP | 325899 A | * | 8/1989 | ............... B60G 3/20 |

(Continued)

OTHER PUBLICATIONS

International Searching Authority, International Search Report and Written Opinion mailed on Sep. 2, 2016, issued in connection with International Application No. PCT/US2016/035065, filed on May 31, 2016, 14 pages.

(Continued)

*Primary Examiner* — Paul N Dickson
*Assistant Examiner* — Tiffany L Webb
(74) *Attorney, Agent, or Firm* — McDonnell Boehnen Hulbert & Berghoff LLP

(57) ABSTRACT

A fabricated torque arm for use in a vehicle suspension, including a rod having a solid rectangular cross-section, the rod having a first end and an oppositely disposed second end, a first bushing hub, and wherein the rod is only a single piece cut from a metal plate or sheet, wherein the first bushing hub comprises cut tubing, wherein the first end of the rod has a radius that conforms to an outer surface of the first bushing hub, and wherein the first end of the rod is welded to the outer surface of the first bushing hub.

14 Claims, 11 Drawing Sheets

Related U.S. Application Data

(60) Provisional application No. 62/169,217, filed on Jun. 1, 2015.

(52) U.S. Cl.
CPC ........ *B60G 21/055* (2013.01); *B23P 2700/14* (2013.01); *B60G 2206/10* (2013.01); *B60G 2206/11* (2013.01); *B60G 2206/16* (2013.01); *B60G 2206/722* (2013.01); *B60G 2206/8102* (2013.01); *B60G 2206/8103* (2013.01); *B60G 2206/8109* (2013.01); *B60G 2206/811* (2013.01); *B60G 2206/8201* (2013.01)

(58) Field of Classification Search
CPC .......... B60G 2206/141; B60G 2206/16; B60G 2206/722; B23P 2700/14
See application file for complete search history.

(56) References Cited

U.S. PATENT DOCUMENTS

| | | | |
|---|---|---|---|
| 2,241,418 A | 5/1941 | Nystrom | |
| 2,953,674 A | 9/1960 | Grodt | |
| 3,121,348 A | 2/1964 | Reed | |
| 3,256,007 A | 6/1966 | Hunsaker | |
| 4,473,241 A | 9/1984 | von der Ohe et al. | |
| 5,282,396 A | 2/1994 | Crandall | |
| 5,340,146 A * | 8/1994 | Kato | B60G 7/001 280/124.135 |
| 5,403,031 A * | 4/1995 | Gottschalk | B62D 17/00 280/86.753 |
| 5,649,719 A * | 7/1997 | Wallace | B60G 7/02 280/124.108 |
| 6,244,496 B1 | 6/2001 | Kato et al. | |
| 6,267,526 B1 | 7/2001 | McLaughlin | |
| 6,308,591 B1 | 10/2001 | Dankow et al. | |
| 6,619,533 B1 | 9/2003 | Hootman et al. | |
| 8,973,909 B2 | 3/2015 | Noble et al. | |
| 9,903,410 B2 | 2/2018 | Zou et al. | |
| 9,956,838 B2 | 5/2018 | Mosteiro Goyoaga et al. | |
| 2003/0034625 A1 | 2/2003 | Runte et al. | |
| 2004/0070129 A1 | 4/2004 | Budde et al. | |
| 2005/0258613 A1 | 11/2005 | Kleckner | |
| 2005/0280238 A1* | 12/2005 | Keeler | B60G 7/001 280/124.116 |
| 2006/0232038 A1 | 10/2006 | Weise | |
| 2007/0180698 A1 | 8/2007 | Ide et al. | |
| 2008/0157499 A1 | 7/2008 | Nachbar | |
| 2009/0277010 A1 | 11/2009 | Runte et al. | |
| 2011/0025010 A1 | 2/2011 | Kawata et al. | |
| 2011/0133425 A1 | 6/2011 | Jeong | |
| 2011/0210528 A1 | 9/2011 | Haas et al. | |
| 2011/0227307 A1 | 9/2011 | Nataraj et al. | |
| 2012/0001397 A1 | 1/2012 | McLaughlin | |
| 2012/0043735 A1 | 2/2012 | Grauer et al. | |
| 2013/0328283 A1 | 12/2013 | Korte et al. | |
| 2014/0001725 A1 | 1/2014 | Matsumoto | |
| 2014/0008886 A1 | 1/2014 | Ueno et al. | |
| 2014/0138928 A1 | 5/2014 | Rager | |
| 2014/0239608 A1 | 8/2014 | Mohrlock et al. | |
| 2015/0008654 A1 | 1/2015 | Haselhorst et al. | |
| 2015/0130159 A1 | 5/2015 | Nakasato | |
| 2015/0283595 A1 | 10/2015 | Haselhorst et al. | |
| 2015/0362008 A1 | 12/2015 | Jung et al. | |
| 2016/0075201 A1 | 3/2016 | Mosteiro Goyoaga | |
| 2016/0107494 A1 | 4/2016 | Narita | |
| 2016/0152105 A1 | 6/2016 | Suzumori | |
| 2016/0167471 A1 | 6/2016 | Hudler et al. | |
| 2017/0001489 A1 | 1/2017 | Mosteiro Goyoaga | |
| 2017/0144499 A1 | 5/2017 | Kimura et al. | |
| 2017/0259635 A1 | 9/2017 | Jansen | |
| 2017/0305223 A1 | 10/2017 | Bronswick et al. | |
| 2017/0343072 A1 | 11/2017 | Kaneko | |
| 2018/0154721 A1 | 6/2018 | Meyer | |
| 2018/0186203 A1 | 7/2018 | Meyer et al. | |
| 2019/0329614 A1* | 10/2019 | Borkholder | B60D 1/248 |
| 2020/0114987 A1* | 4/2020 | Kitashiba | B62D 35/02 |
| 2022/0048349 A1* | 2/2022 | Stieglitz | F16C 7/026 |
| 2022/0153075 A1* | 5/2022 | Mohrlock | B60G 7/001 |
| 2022/0195573 A1* | 6/2022 | Arayama | C22C 21/14 |
| 2022/0203420 A1* | 6/2022 | Sato | B21D 5/01 |

FOREIGN PATENT DOCUMENTS

| | | | | |
|---|---|---|---|---|
| EP | 2818341 | | 12/2014 | |
| EP | 2818341 A1 | | 12/2014 | |
| FR | 2938470 A1 * | | 5/2010 | ........... B60G 21/051 |
| JP | 11078454 A * | | 3/1999 | |
| JP | 2010274823 | | 12/2010 | |
| JP | 2010274823 A | | 12/2010 | |
| WO | 2014203420 A1 | | 12/2012 | |
| WO | 2014203420 | | 12/2014 | |

OTHER PUBLICATIONS

Hearing Notice, Indian Patent Office, Indian Patent Application No. 201727038275, mailed Jul. 21, 2023, 2 pages.

* cited by examiner

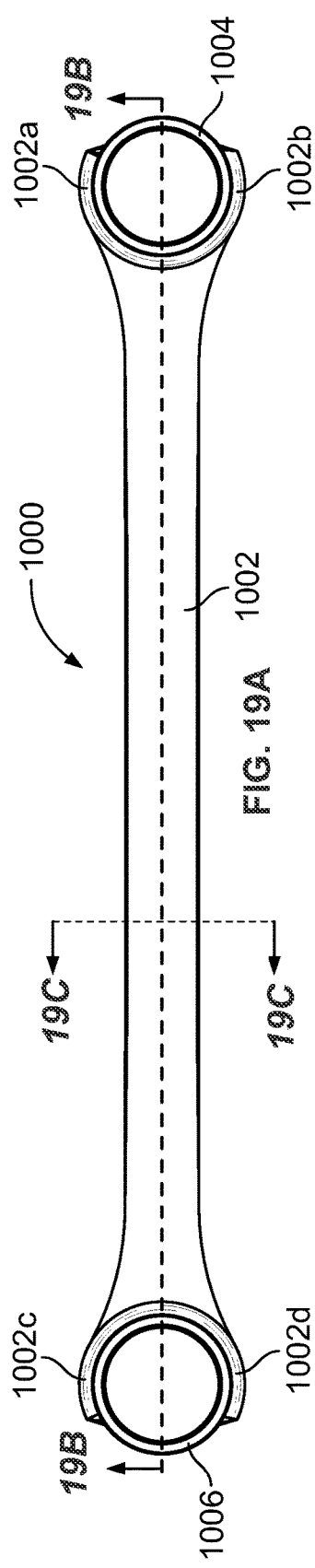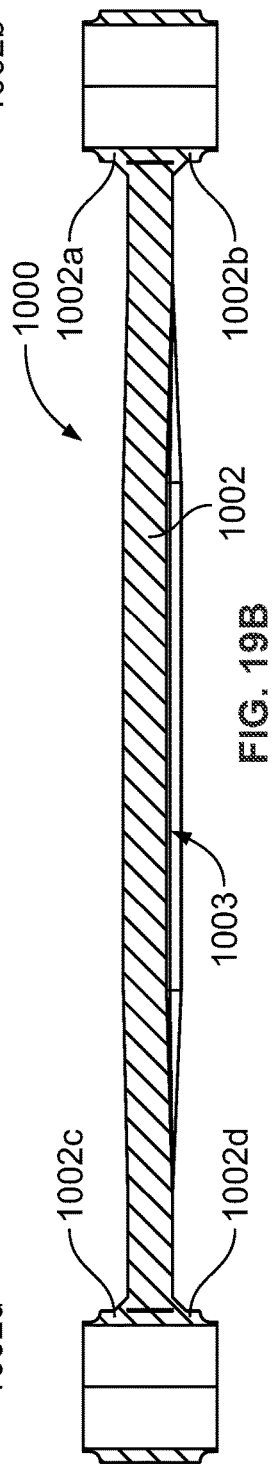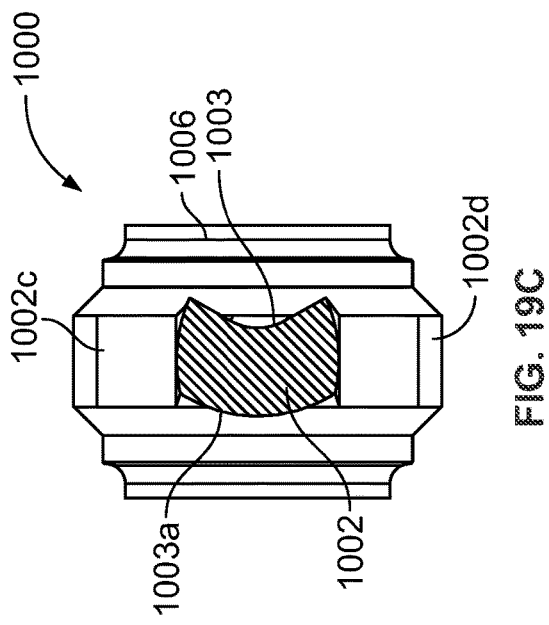

TORQUE ROD FOR VEHICLE SUSPENSION

This application claims priority to U.S. patent application Ser. No. 15/168,936 entitled "Torque Rod For Vehicle Suspension" filed May 31, 2016, claiming priority to U.S. Provisional Patent Application No. 62/169,217 entitled "Torque Rod For Vehicle Suspension" filed on Jun. 1, 2015, the contents of both of which are incorporated herein by reference in their entirety.

BACKGROUND

The present embodiments generally relate to torque rods for use in vehicle suspensions. More particularly, the present invention relates to a fabricated torque rod for use in a vehicle suspension. The commercial vehicle industry uses linkages extensively in vehicle suspensions for the purpose of pivotably connecting the axles to a vehicle in order to allow articulation so as to provide ride comfort, stability, and control of the vehicle. Commonly known as torque rods, these linkages are used both in the transverse or lateral direction as well as longitudinally and must be strong enough to transfer all of the loads from the axle to the vehicle chassis. Torque rods are manufactured in a variety of lengths and sizes for different loads, but all generally take a similar shape and function consisting of a main rod portion with round hubs at either end for the purpose of adapting a flexible bushing to allow a pivotable connection between the vehicle and axle. Many different manufacturing methods and materials are employed including forging or casting the entire rod portion and hubs as a single piece, two-piece construction including two forged ends with a telescoping feature allowing them to be welded to a particular length, and 3 piece designs with separate hubs and tubular rod portion that may be connected either thru welding or swaging.

Current technologies used to make torque rods require specialized tooling and equipment such as forging dies and presses, casting molds and foundries, or specialized tubing and swaging or resistance welding equipment. This makes them more difficult to manufacture typically requiring that large quantities be manufactured where the foundry or forging house exists. Other torque rods fabricated using tubing for the rod portion itself typically require specialized seamless tubing and resistance welding or swaging operations.

It would be desirable to provide a torque rod that may be simply manufactured without the need for costly specialized forging or casting equipment and that can be fabricated without the need for sophisticated manufacturing equipment, as in some parts of the world, such as parts of India and China, sophisticated manufacturing equipment is not available. It would also be desirable to provide a fabricated torque rod that is a low-cost alternative to forged or cast torque rods, yet still provides the required strength.

SUMMARY

In one aspect, a low-cost and easily fabricated torque rod cut from a metal plate or metal sheet such as standard plate steel with welded-on tubular hubs cut from standard ERW (Electrically Resistance Welded) or seamless tubing is provided. The rod portion of the torque rod can be easily manufactured without specialized equipment or tooling in any part of the world where plate steel and ERW tubing (or seamless tubing) are readily available. Plate steel can readily be cut using common manufacturing techniques including plasma, laser, or waterjet to create the main rod portion and the hub ends can be cut to length from a length of tubing and welded to the plate steel rod portion to create a low-cost fabricated torque rod for any number of commercial vehicle applications.

In another aspect, a fabricated torque rod for use in a vehicle suspension is provided including a rod having a first end and an oppositely disposed second end, a first bushing hub; and a second bushing hub, wherein the rod comprises a piece cut from a metal plate or sheet, wherein the first bushing hub comprises cut tubing, wherein the second bushing hub comprises cut tubing, wherein the first end of the rod has a radius that conforms to an outer surface of the first bushing hub, wherein the second end of the rod has a radius that conforms to an outer surface of the second bushing hub, wherein the first end of the rod is welded to the outer surface of the first bushing hub, and wherein the second end of the rod is welded to the outer surface of the second bushing hub.

In yet a further aspect, a method of fabricating a torque rod is provided including the steps of cutting a rod out of a piece of metal plate or sheet that is at least ¼ inch thick, cutting a first piece of tubing to form a first bushing hub, cutting a second piece of tubing to form a second bushing hub, welding a first end of the rod to the first bushing hub, and welding a second end of the rod to the second bushing hub.

In addition, means for constructing a fabricated torque rod for a vehicle suspension is provided.

BRIEF DESCRIPTION OF THE DRAWINGS

Exemplary embodiments of the invention are described herein with reference to the drawings, wherein like parts are designated by like reference numerals, and wherein:

FIG. 19A is a side view of torque rod 1000;

FIG. 19B is a cross-sectional view of torque rod 1000 taken along lines 19B-19B in FIG. 19A;

FIG. 19C is a cross-section view of torque rod 1000 taken along lines 19C-19C in FIG. 19A;

DETAILED DESCRIPTION OF THE INVENTION

The present embodiments are directed to a fabricated torque rod for use in a vehicle suspension. The low-cost, easily manufactured torque rod does not require forgings or casting and may be advantageously constructed using plate steel or sheet steel and readily available tubing that can be cut to size to form the bushing hubs. The bushing hubs can be welded to the rod, and a pair of fingers on each end of the rod is welded to an outer surface of the bushing hubs to form the torque rod. As used herein, the term "metal plate" shall encompass what is referred as plate steel or sheet steel.

Figure 1:
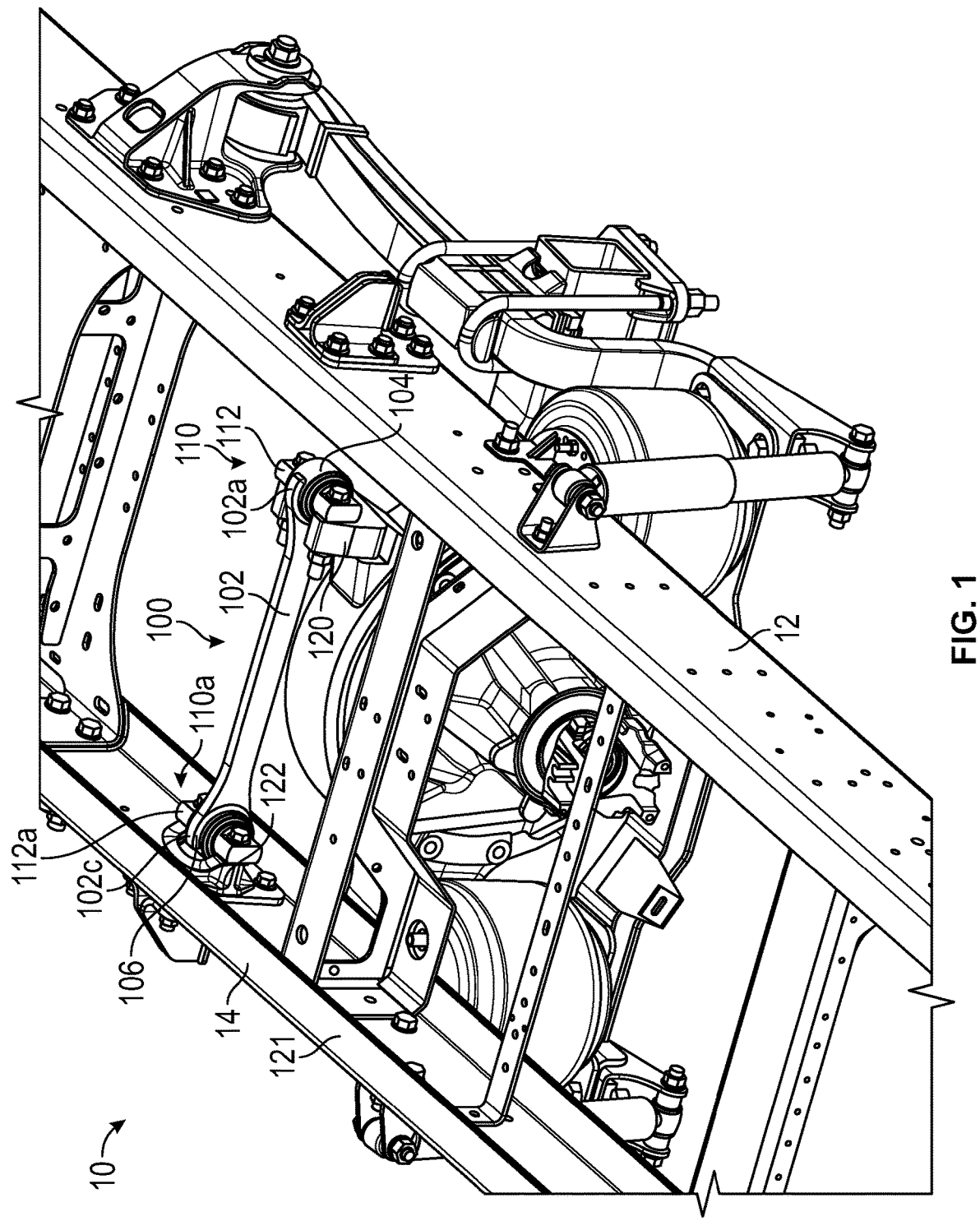
FIG. 1 is a front perspective view of suspension assembly 10 having a transverse torque rod 100, according to an example embodiment.

FIG. 1 is a front perspective view of suspension assembly 10 attached to vehicle frame rails 12, 14. A transverse torque rod 100 extends inwardly from frame rail 14. Transverse torque rod 100 may be constructed in accordance with the embodiments described in the Figures below. Transverse torque rod 100 includes a rod 102 that has a first end with fingers 102a (and 102b not visible in FIG. 1) welded to an outer surface of first bushing hub 104. A first bushing assembly 110 is positioned within bushing hub 104 with a bar pin 112 that is bolted to axle mount 120. Transverse torque rod 100 also has a second end with fingers 102c (and 102d not visible in FIG. 1) welded to an outer surface of second bushing hub 106. A second bushing assembly 110a is positioned within second bushing hub 106 with a bar pin 112a that is bolted to vehicle frame rail mount 122.

Figure 2:
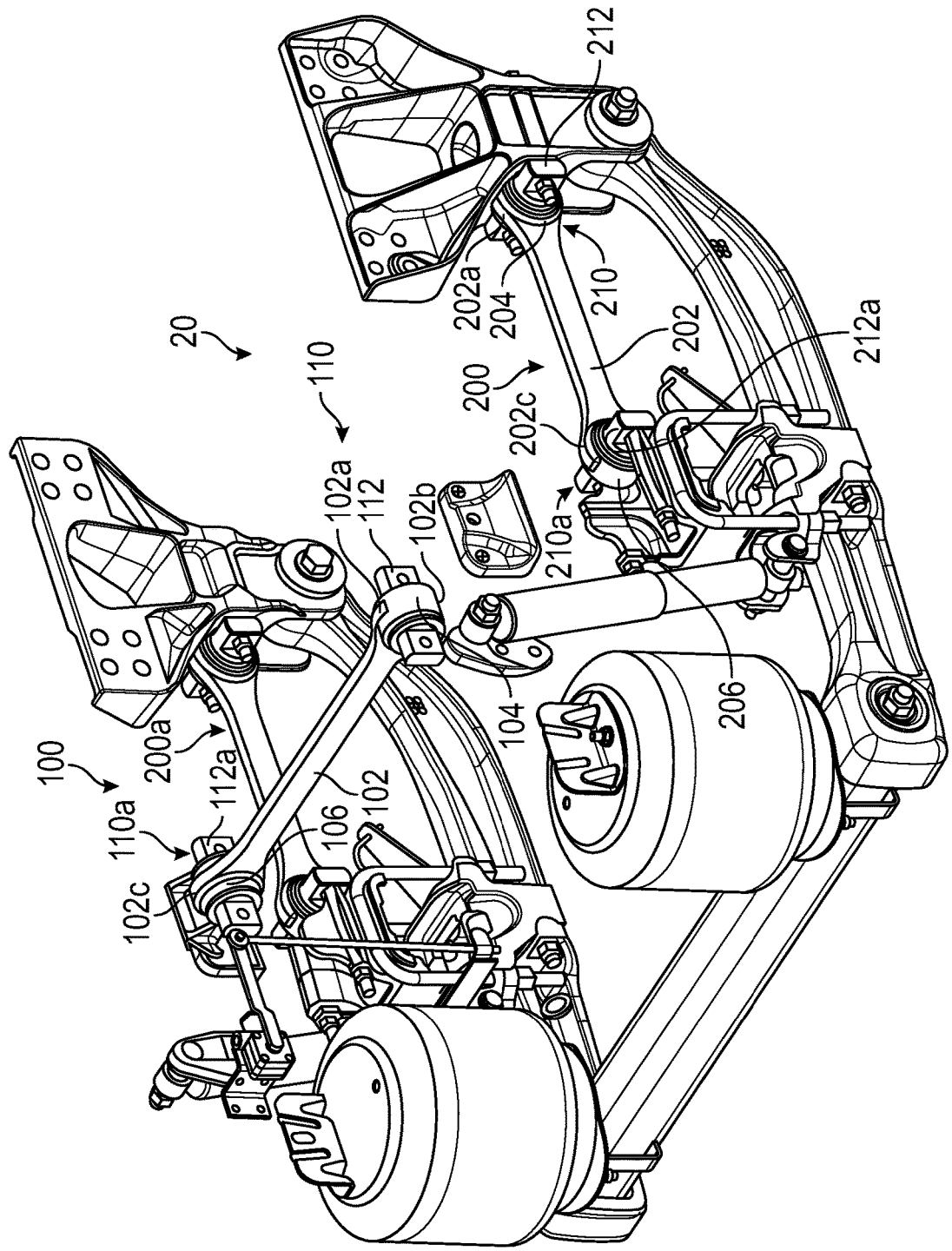
FIG. 2 is a perspective view of vehicle suspension 20 having a transverse torque rod 100 and a longitudinal torque rod 200, according to an example embodiment.

FIG. 2 is a perspective view of vehicle suspension 20 (shown without the vehicle frame or axle) having a transverse torque rod 100 and a longitudinal torque rod 200. Transverse torque rod 100 and longitudinal torque rod 200 may be constructed the same and in accordance with the embodiments described in the Figures below. Transverse torque rod 100 includes a rod 102 that has a first end with fingers 102a and 102b welded to an outer surface of first bushing hub 104. The fingers 102a and 102b and the end of the rod extending between them may be welded to the first bushing hub 104. A first bushing assembly 110 is positioned within bushing hub 104 with a bar pin 112 that may be bolted to an axle mount. Transverse torque rod 100 also has a second end with fingers 102c (and 102d not visible in FIG. 1) welded to an outer surface of second bushing hub 106. A second bushing assembly 110a is positioned within second bushing hub 106 with a bar pin 112a that may be bolted to a vehicle frame rail mount.

Longitudinal torque rods 200 and 200a are shown positioned extending longitudinally on opposite sides of the vehicle suspension 20. Longitudinal torque rods 200 and 200a may be constructed the same. In FIG. 2, longitudinal torque rod 200 includes a rod 202 having a first end with fingers 202a (and 202b not visible in FIG. 2) welded to a first bushing hub 204 with bar pin bushing assembly 210 positioned with the hub where bar pin 212 may be bolted to a vehicle frame rail mount or frame hanger or other component of the vehicle frame. A second end of rod 202 has fingers 202c (and 202d not visible in FIG. 2) welded to an outer surface of a second bushing hub 206. A bar pin bushing assembly 210a is positioned within the second bushing hub 206 and a bar pin 212a may be bolted to a frame hanger or other component of vehicle suspension 20.

Figure 3:
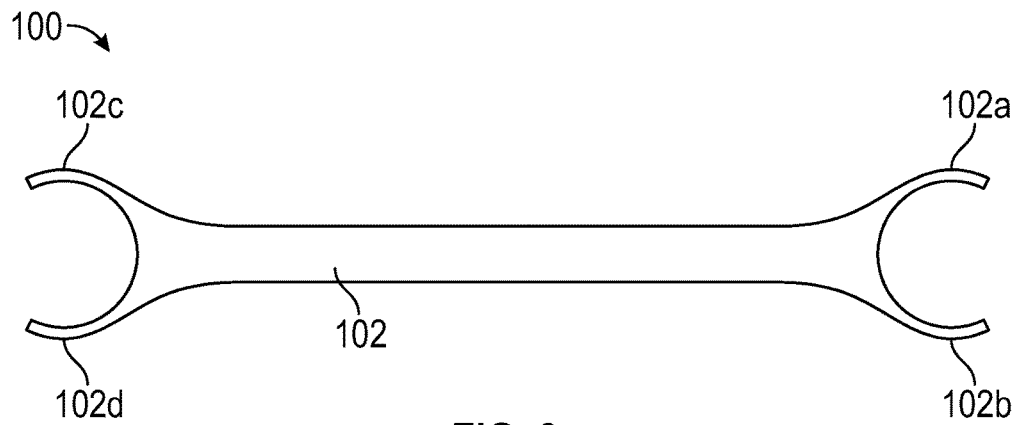
FIG. 3 is a side view of the rod 102 of torque rod 100 shown in FIG. 1.

FIG. 3 is a side view of the rod portion 102 of torque rod 100 shown in FIGS. 1 and 2. The rod portion 102 may advantageously be cut from plate steel of sheet steel, such as Grade 50 structural steel. Other metals or material such as aluminum could also be used in certain applications. Depending on the application, the plate steel may have a thickness from ¼ inch to ¾ inch thick, or thicker. The plate steel or sheet steel may be readily cut using plasma, laser, or waterjet cutting techniques. Rod portion 102 has a first end with fingers 102a and 102b that together form a circular inner diameter where the fingers 102a and 102b may be welded to an outer surface of a first bushing hub formed of cut tubing. Rod portion 102 has a second end with fingers 102c and 102d that together form a circular inner diameter where fingers 102c and 102d may be welded to an outer surface of a second bushing hub formed of cut tubing. The fingers 102a and 102b may also extend further such that the fingers 102a and 102b form a complete circle. Similarly, the fingers 102c and 102d may also extend further such that the fingers 102c and 102d form a complete circle. In such a case, a larger weld area could be provided to allow for a larger weld surface to the bushing hubs.

The use of plate steel or sheet steel, or other metal plate for the rod portion 102 provides a number of advantages over other torque rod designs. For example, the rod portion 102 and fingers 102a-d may be cut as a single, contiguous unitary member cut from a metal plate or sheet. However, in other embodiments one or more of the fingers 102a-d could be welded to rod portion 102. For example, a piece of metal plate or sheet could be cut into a single piece that includes only a single finger on each end of the rod portion 102. On either end of the rod portion 102, a separate finger could then be welded to the rod portion 102 opposite from the finger that is already attached to the rod portion 102 as a single piece. Cutting a piece of metal plate or sheet to provide a single piece that includes only a single finger on each of the rod portion 102 provides the advantage of being able to nest single pieces to be cut adjacent to each other, allowing nearly all of the metal plate or sheet to be utilized with little scrap. For example, in one application, by nesting the adjacent single pieces to be cut from the metal plate or sheet such that one cut would create an edge for separate rods (and fingers on each end), provides for a much closer to optimal material utilization (134 pcs out of a 72"×84" metal plate or sheet).

In other applications, rather than provide fingers on the rod portion 102, the ends of rod portion 102 could be provided with cutouts that conform to the outer surface of the tubing to be used for the bushing hubs, and the ends of the rod portion 102 could be welded to the outer surface of the bushing hubs. Furthermore, in some applications, only a single finger on the end of the rod portion 102 could be used and welded to the bushing hubs. When using a single finger, in some application the finger could encircle more than half of the bushing hub.

Unlike cast torque rod designs, the torque rod 100 may be cut to any desired length and the fingers cut and sized based on the available tubing for the bushing hub. Expensive and sophisticated forging and casting machinery are also not required in the manufacture of the torque rod 100. Seamless tubes have been used in some torque rod designs for the rod portion. However, the cost of seamless tubing is on the order of 3 times more expensive than using cut plate steel. Furthermore, in some parts of the world, such as in China and India, sophisticated and expensive machinery is not available. Therefore, in such areas, a torque rod may be fabricated simply using cut plate steel or sheet steel for the rod and cut tubing for the hubs.

Figure 4:
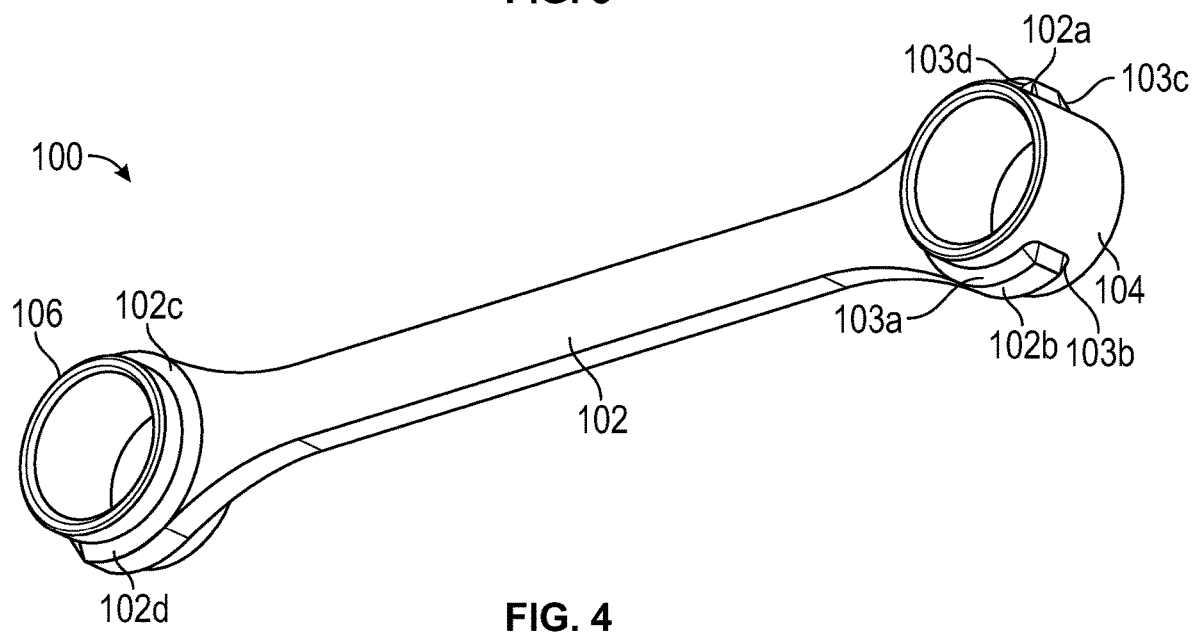
FIG. 4 is a perspective view of torque rod 100 with rod 102 welded to bushing hubs 104 and 106.

FIG. 4 is a perspective view of torque rod 100 with rod portion 102 and fingers 102a-d welded to bushing hubs 104 and 106. In particular, bushing hubs may be constructed of a length of cut tubing, such as ERW (Electrical Resistance Welding) or seamless tubing. First bushing hub 104 may simply be welded to fingers 102a and 102b of rod portion 102 using welds 103a and 103b, and second bushing hub 106 may simply be welded to fingers 102c and 102d of rod portion 102 using welds 103c and 103d. The first and second bushing hubs 104, 106 may have an inner diameter of 2.5 to 3 inches, although larger or smaller inner diameters are also possible depending on the application. The first and second bushing hubs 104, 106 may have a wall thickness of ⅜ths of an inch, although thinner or thicker wall thicknesses may also be used depending on the application. The tubing used for the first and second bushing hubs 104, 106 may be DOM (drawn over mandrel) tubing which allows for more accurate tolerances on the outer diameter of the tubing. The tubing may be made from 1020 or 1026 steel, or other metals and material such as aluminum.

As noted above, current technologies involve specialized tooling and equipment such as forging dies and presses, casting molds and foundries, or specialized tubing and swaging or resistance welding equipment. As a result, torque rods are more difficult to manufacture typically requiring that large quantities be manufactured where the foundry or forging house exists. Other torque rods that are fabricated using tubing for the rod body itself typically require specialized seamless tubing and expensive resistance welding or swaging operations. The present embodiments may be fabricated using minimal and readily available equipment, and can be fabricated using a simple plasma cutter and readily available non-robotic welding equipment throughout the world without any specialized tooling required.

The present embodiments may utilize plate steel or sheet steel (defined as flat rolled steel of ¼" or greater thickness) and ERW or seamless tubing. With no tooling, the main rod portion 102 (and fingers 102a-d when used) may be cut from the plate steel or sheet using conventional plasma cutting equipment (or laser or waterjet cutting equipment) and the tubes used to form the first and second bushing hubs 104, 106 may be cut to length in a horizontal band saw. A manual or robotic welder can also be used to connect the tubes to the ends of the plate or sheet steel rod portion. All of this requires no specialized tooling and no highly specialized equipment.

Figure 5:
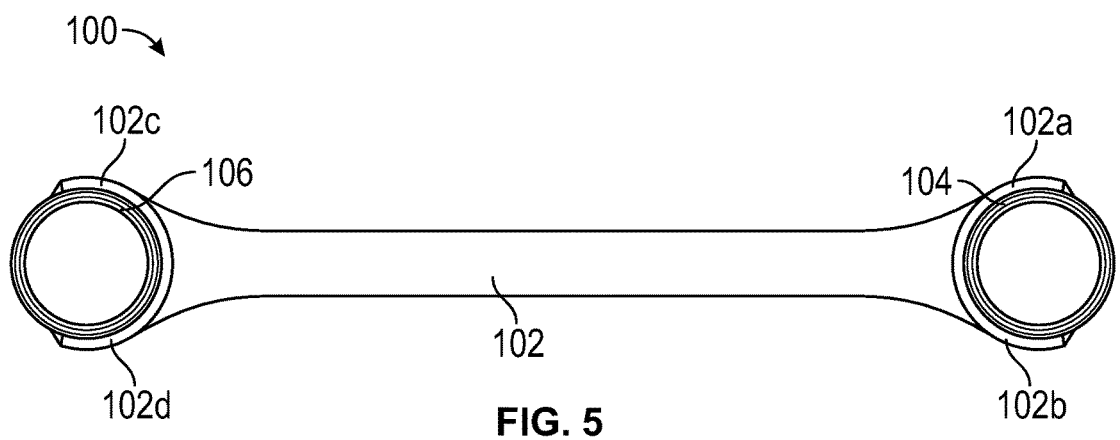
FIG. 5 is a side view of torque rod 100 shown in FIG. 4 with rod 102 welded to bushing hubs 104 and 106.

FIG. 5 is a side view of torque rod 100 shown in FIG. 4 with rod 102 welded to bushing hubs 104 and 106. The fingers 102a and 102b on the first end of the rod 102 extend more than halfway around the outer surface of the first bushing hub 104, and the fingers 102c and 102d on the second end of the rod 102 extend more than halfway around the outer surface of the second bushing hub 106. The fingers 102a-d are shown extending more than half way around the outer surface of the bushing hubs, thereby advantageously providing for a larger area for the weld as compared to if a tubular rod body were used, and in turn providing added strength.

Figure 6:
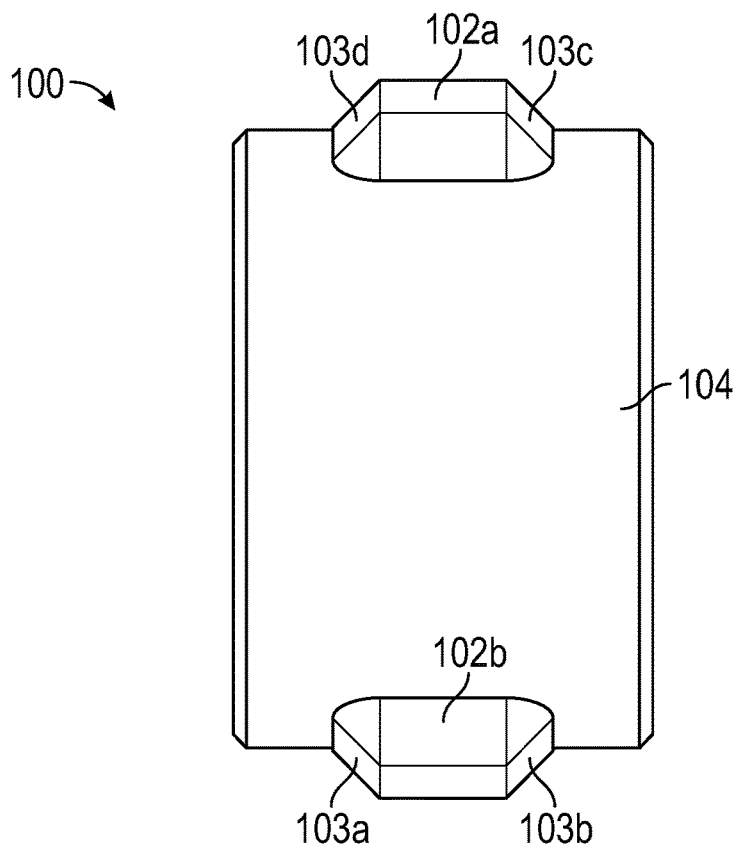
FIG. 6 is an end view of torque rod 100 shown in FIGS. 4 and 5.

FIG. 6 is an end view of torque rod 100 shown in FIGS. 4 and 5 where fingers 102a and 102b can be seen welded to first bushing hub 104 using welds 103a-d and extending over and beyond a maximum diameter of the outer surface of first bushing hub 104.

Figure 7:
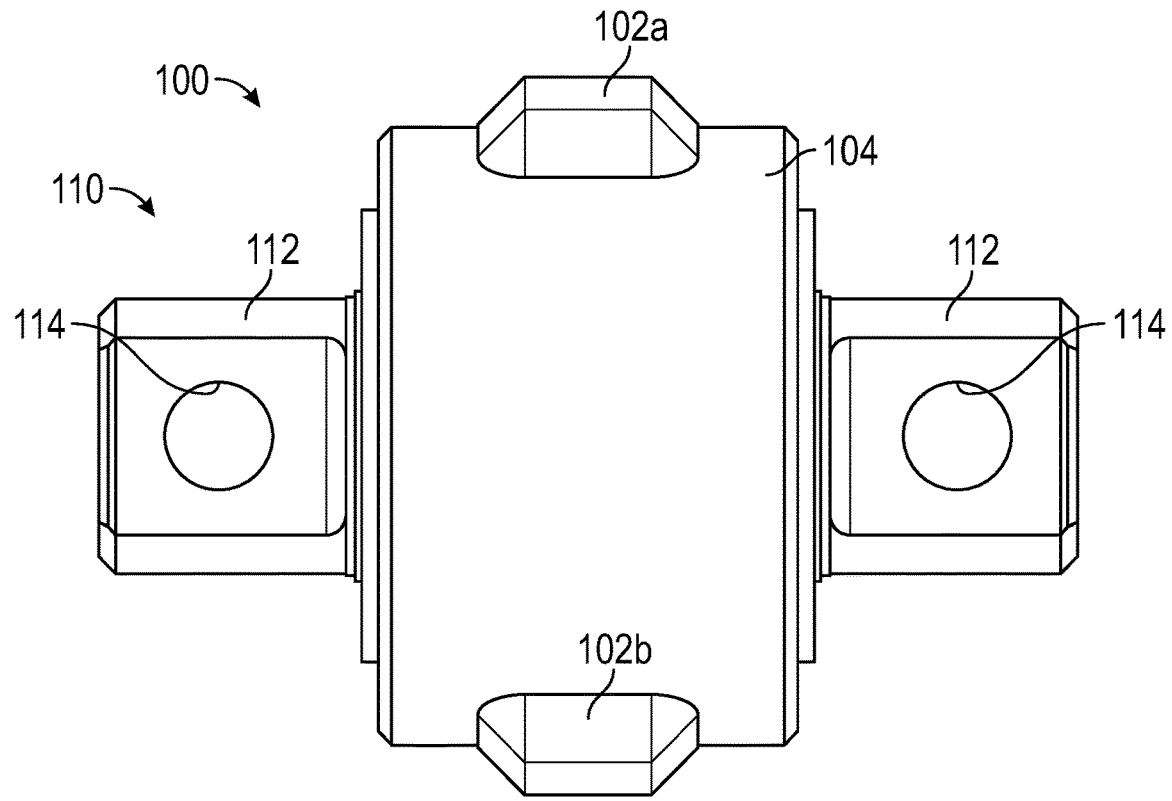
FIG. 7 is an end view of torque rod 100 shown in FIG. 6 with bushing assembly 110 positioned in bushing hub 104.

FIG. 7 is an end view of torque rod 100 shown in FIG. 6 with bushing assembly 110 positioned in first bushing hub 104. A variety of bushing assemblies may be used. In FIG. 7, a bar pin bushing assembly is used having bar pin 112 that extends beyond the outer ends of first bushing hub 104 and includes mounting holes 114 that may be used to bolt the bar pin bushing assembly 110 to a mount on the vehicle suspension, axle, or vehicle frame.

Figure 8:
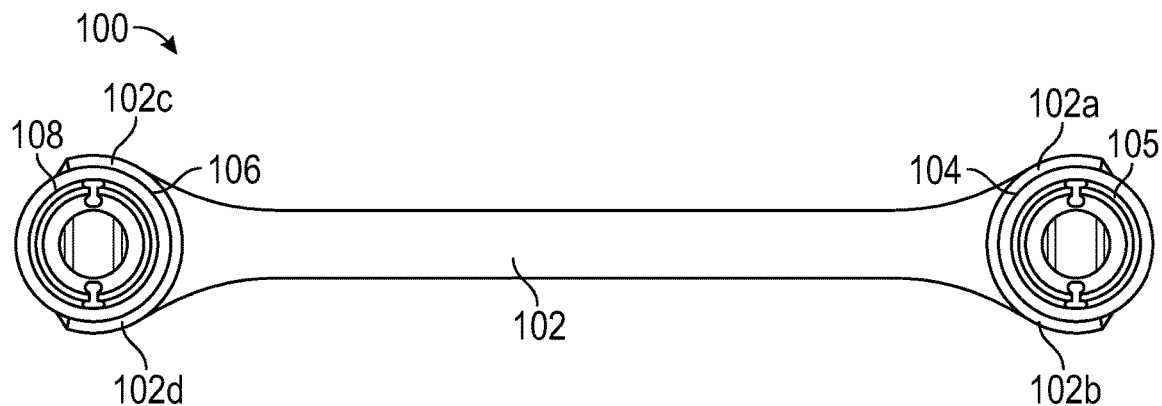
FIG. 8 is a side view of torque rod 100 shown in FIG. 7 with bushing assemblies 110 and 110a positioned in bushing hubs 104 and 106 respectively.

FIG. 8 is a side view of torque rod 100 shown in FIGS. 5-7 with bushing assemblies 110 and 110a positioned in bushing hubs 104 and 106 respectively.

Figure 9:
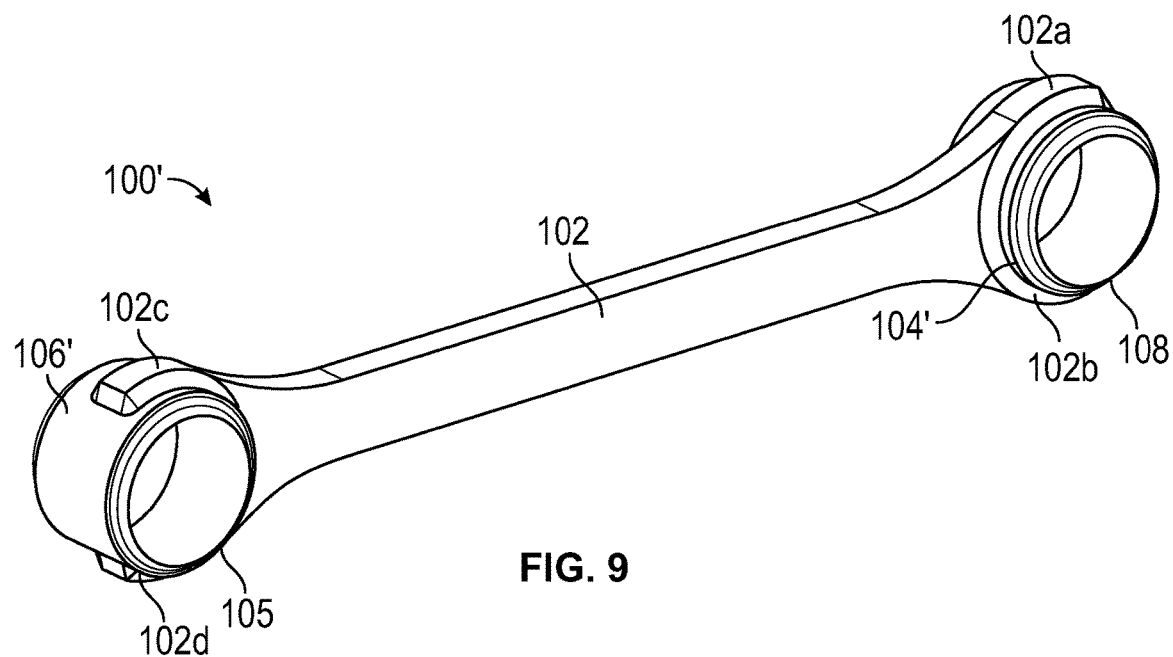
FIG. 9 is a side perspective view of torque rod 100' with bushing hubs 104' and 106' welded to rod 102.
Figure 10:
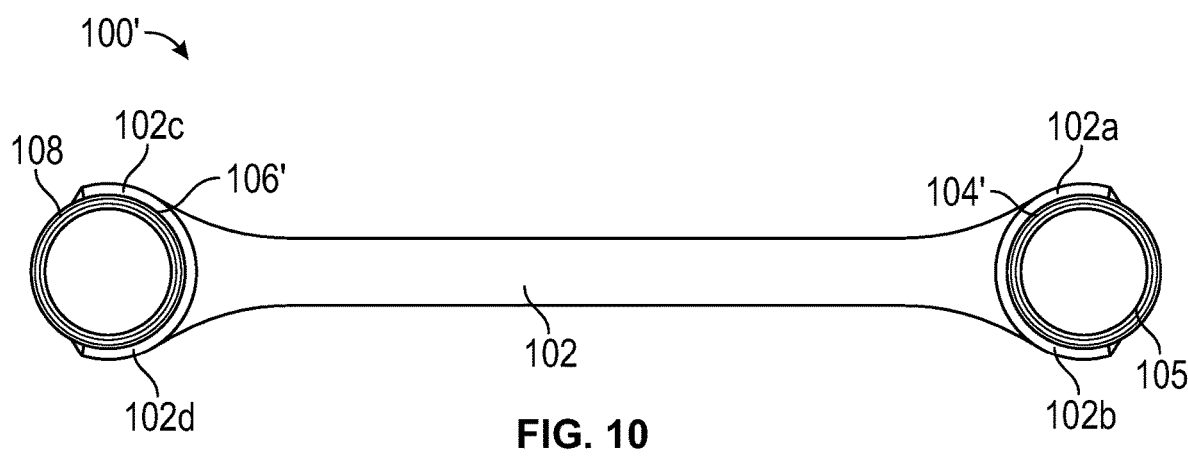
FIG. 10 is a side view of torque rod 100' shown in FIG. 9.

FIG. 9 is a side perspective view of torque rod 100' with bushing hubs 104' and 106' welded to rod 102 and FIG. 10 is a side view of torque rod 100' shown in FIG. 9. Torque rod 100' includes the same rod portion 102 and fingers 102a-d as torque rod 100 shown in FIGS. 1-8. However, in this embodiment, the first bushing hub 104' has a reduced wall thickness on end 105. The reduced wall thickness of end 105 may be formed by machining the inner or outer surfaces of end 105 of the first bushing hub 104' prior to being welded to the fingers 102a and 102b of rod portion 102. Similarly, the second bushing hub 106' has a reduced wall thickness on end 108. The reduced wall thickness of end 108 may be formed by machining the inner or outer surfaces of end 108 of the second bushing hub 106' prior to being welded to the fingers 102c and 102d of rod portion 102.

Figure 11:
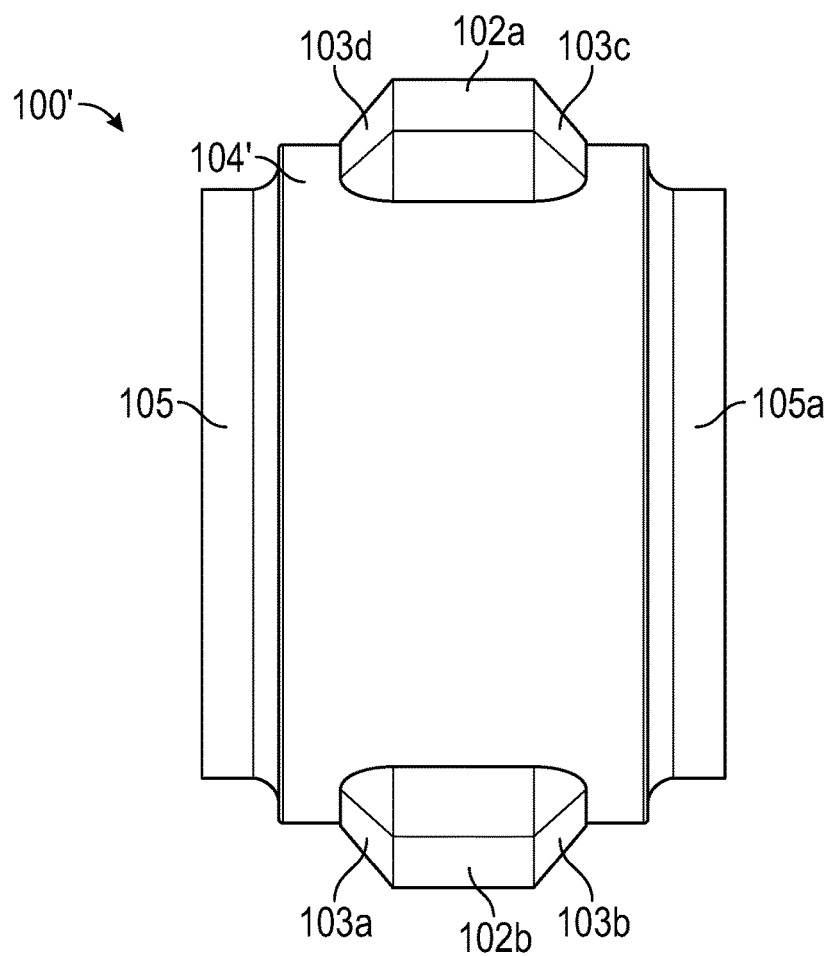
FIG. 11 is an end view of torque rod 100' shown in FIGS. 9 and 10.

FIG. 11 is an end view of torque rod 100' shown in FIGS. 9 and 10 showing reduced outer diameter portions 105 and 105a on the ends of the first bushing hub 104'.

Figure 12:
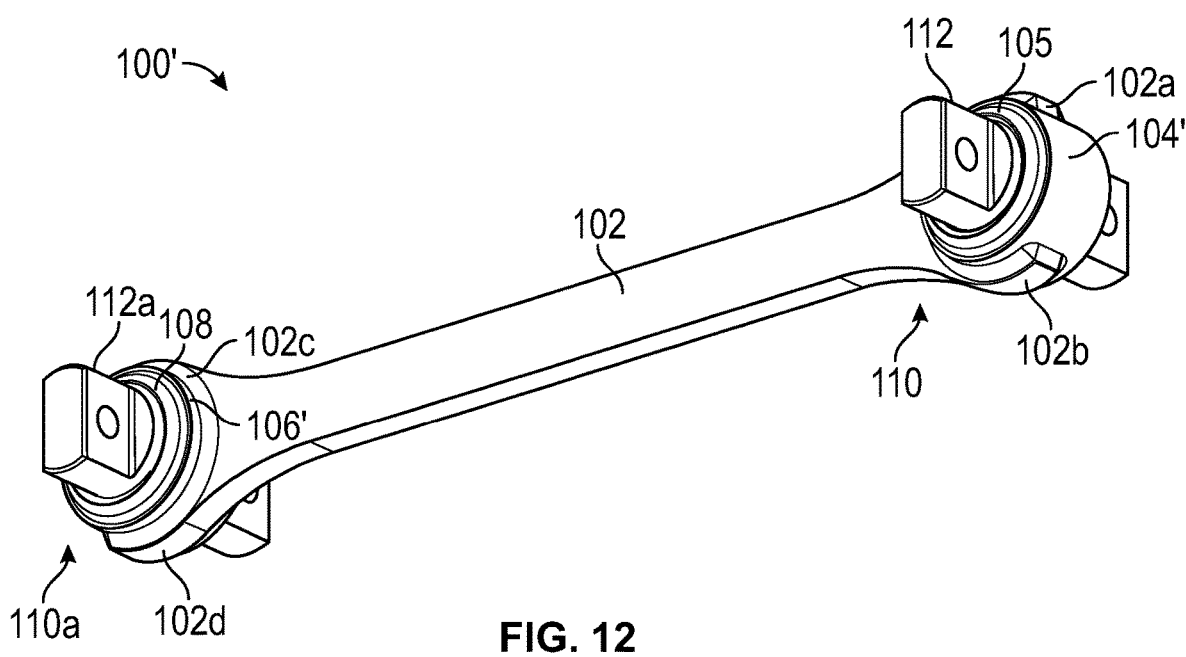
FIG. 12 is a side perspective view of torque rod 100' with bushing assemblies 110 and 110a positioned within bushing hubs 104' and 106'.
Figure 13:
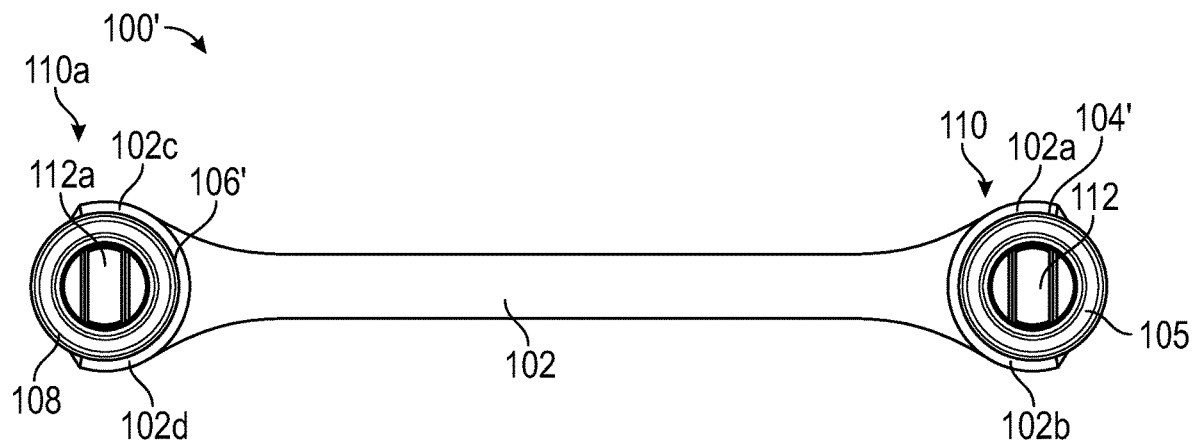
FIG. 13 is a side view of torque rod 100' shown in FIG. 12.

FIG. 12 is a side perspective view of torque rod 100' shown in FIGS. 9-11 with bar pin bushing assemblies 110 and 110a having bar pins 112 and 112a positioned within bushing hubs 104' and 106', and FIG. 13 is a side view of torque rod 100' shown in FIG. 12. Once the bushing assembly 110 is inserted into the first bushing hub 104', the reduced wall thickness end 105 (and 105a on the opposite side as shown in FIG. 11) is curled downwardly (e.g. bent) over the outer edges of the bushing assembly 110 to retain the bushing assembly 110 within the first bushing hub 104'. Similarly, once the bushing assembly 110a is inserted into the second bushing hub 106', the reduced wall thickness end 108 and (and 108a on the opposite side) is curled downwardly over the outer edges of the bushing assembly 110a to retain the bushing assembly 110a within the second bushing hub 106'. Curling the reduced wall thickness ends 105 and 105a over the outer edges of bushing assembly 110 and curling the reduced wall thickness ends 108 and 108a of bushing assembly 110a serves to help prevent "bushing walk" where, in operation, the forces on the bushing assembly may have a tendency for the bushing assembly to move transversely within the bushing hub.

Figure 14:
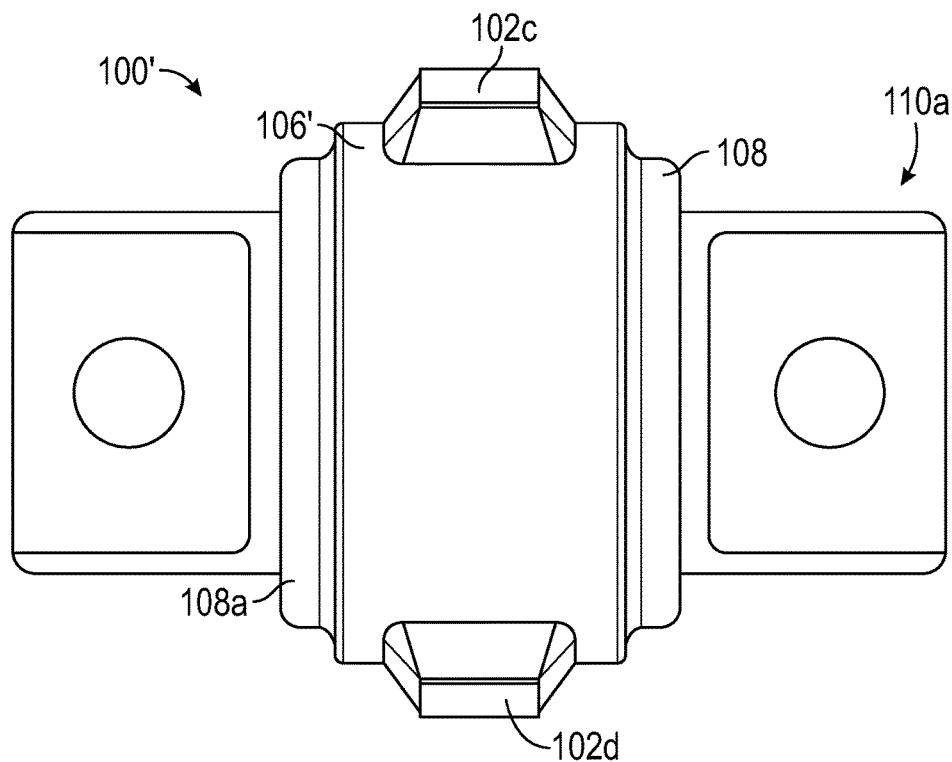
FIG. 14 is another end view of torque rod 100' shown in FIGS. 12 and 13 with bushing assembly 110a positioned within bushing hub 106'.

FIG. 14 is another end view of torque rod 100' shown in FIGS. 12 and 13 with bushing assembly 110a positioned within bushing hub 106'. Outer edges of bushing assembly 110a are retained by the curled down reduced wall thickness ends 108 and 108a, and fingers 102c and 102d can be seen welded to bushing hub 106' and extending past a maximum outer diameter of bushing hub 106'. The reduced wall thickness of ends 108 and 108a may be ¼ to ½ the wall thickness of the bushing hub 106'.

Figure 15:
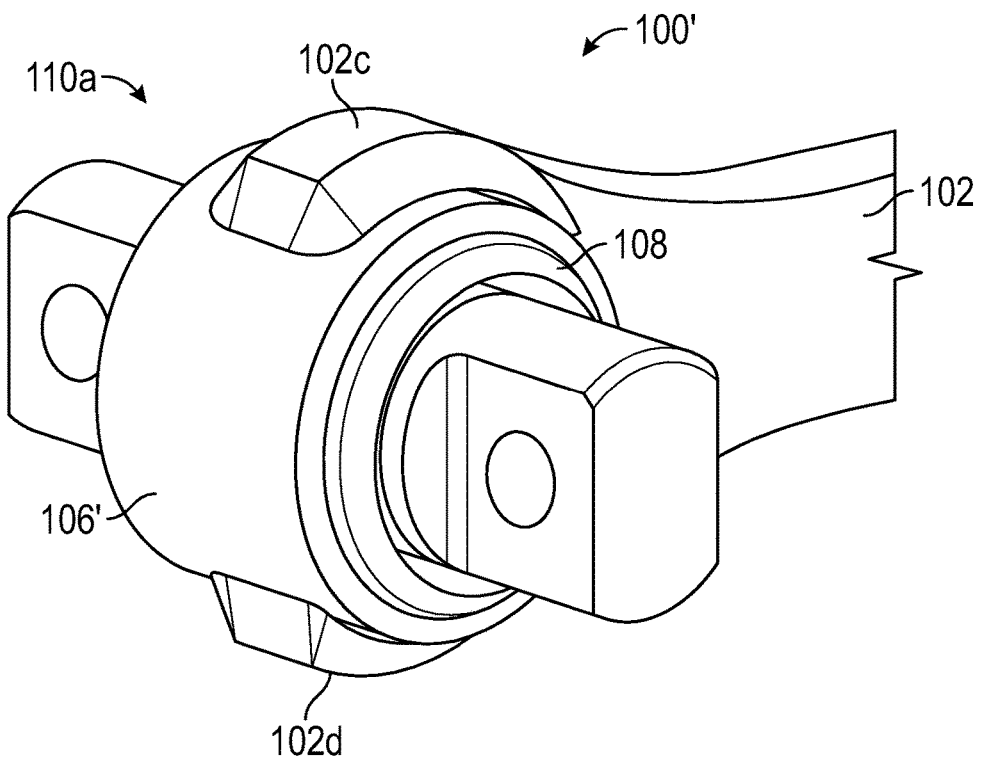
FIG. 15 is a perspective end view of torque rod 100' shown in FIG. 14.

FIG. 15 is a perspective end view of torque rod 100' shown in FIG. 14 providing another view of reduced wall thickness end 108 of bushing hub 106' extending over an outer edge of bushing assembly 110a to retain bushing assembly 110a within the bushing hub 106', and fingers 102c and 102d are shown welded to an outer surface of bushing hub 106.

Figure 16:
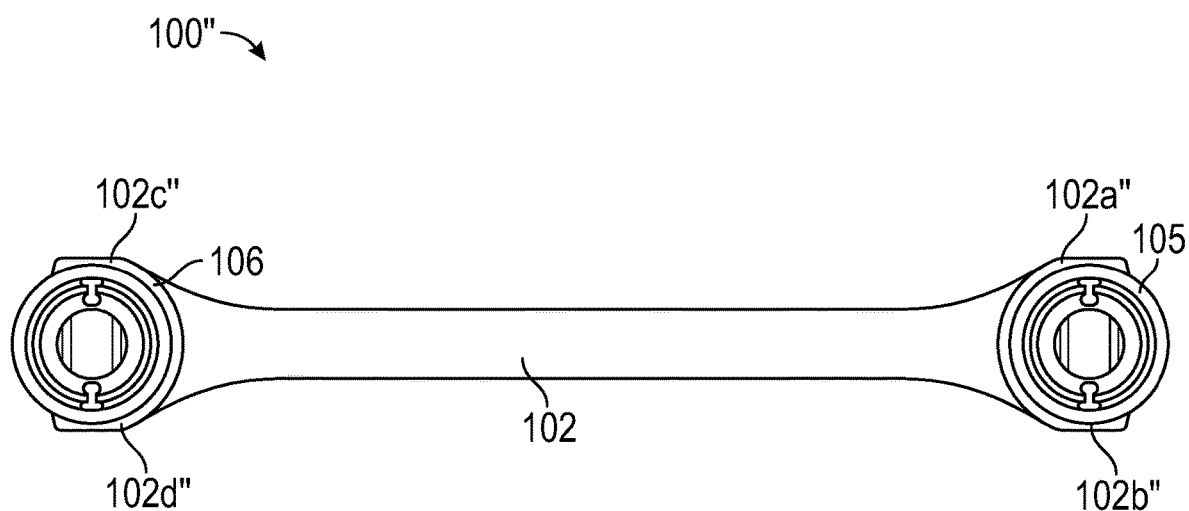
FIG. 16 is side view of torque rod 100" shown with flattened fingers 102a"-d"

FIG. 16 is side view of torque rod 100" shown with flattened fingers 102a"-d". The rod portion 102 and bushing hubs 104 and 106 of torque rod 100" are the same as in torque rod 100 shown in FIGS. 1-8. However, in this embodiment, the fingers 102a"-d" have a flattened outer surface to provide for additional clearance that is required in certain applications. The thickness of the fingers 102a"-d" could be 3 mm at the flattened section. The flattened outer surface of fingers 102a"-d" may be achieved by machining the fingers 102a"-d" after they have been welded to the bushing hugs 104 and 106.

Figure 17:
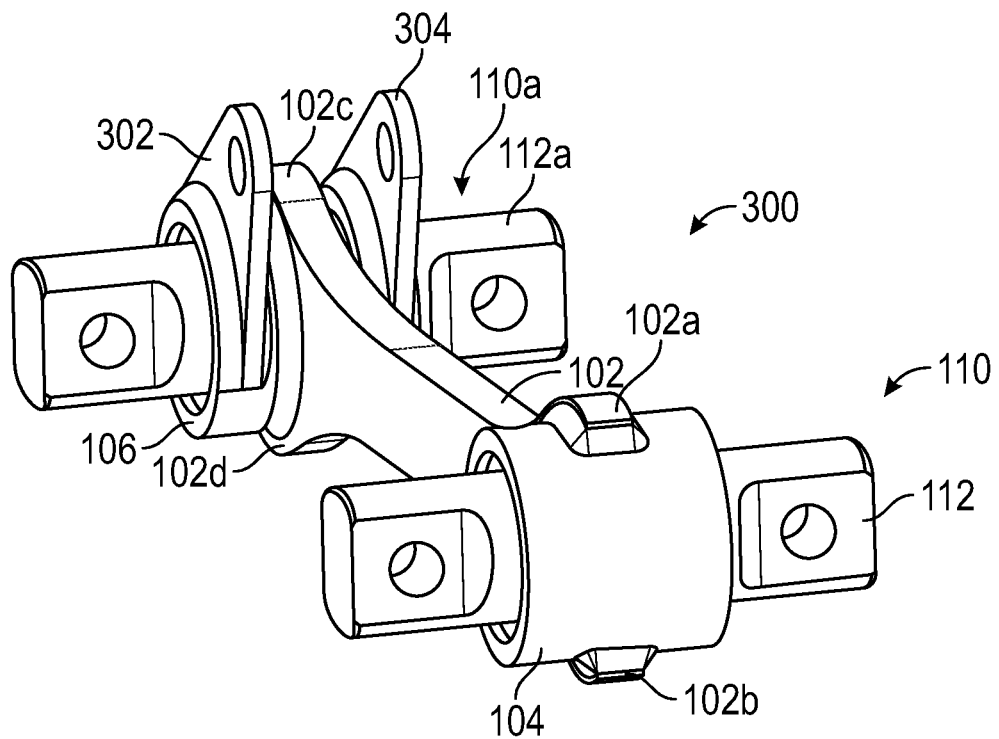
FIG. 17 is a perspective view of torque rod 300 having a pair of mounting flanges 302 and 304 welded to bushing hub 106.

FIG. 17 is a perspective view of torque rod 300 having a pair of mounting flanges 302 and 304 welded to bushing hub 106. Torque rod 300 has the same configuration as torque rod 100 as shown in FIGS. 1-8, including the rod portion 102, fingers 102a-d, and bushing hubs 106 and 104. However, torque rod 300 further includes two mounting flanges 302 and 304 welded to bushing hub 106 on opposite sides of fingers 102c and 102d. Mounting flanges 302 and 304 may be used to mount a shock absorber or other suspension component.

Figure 18:
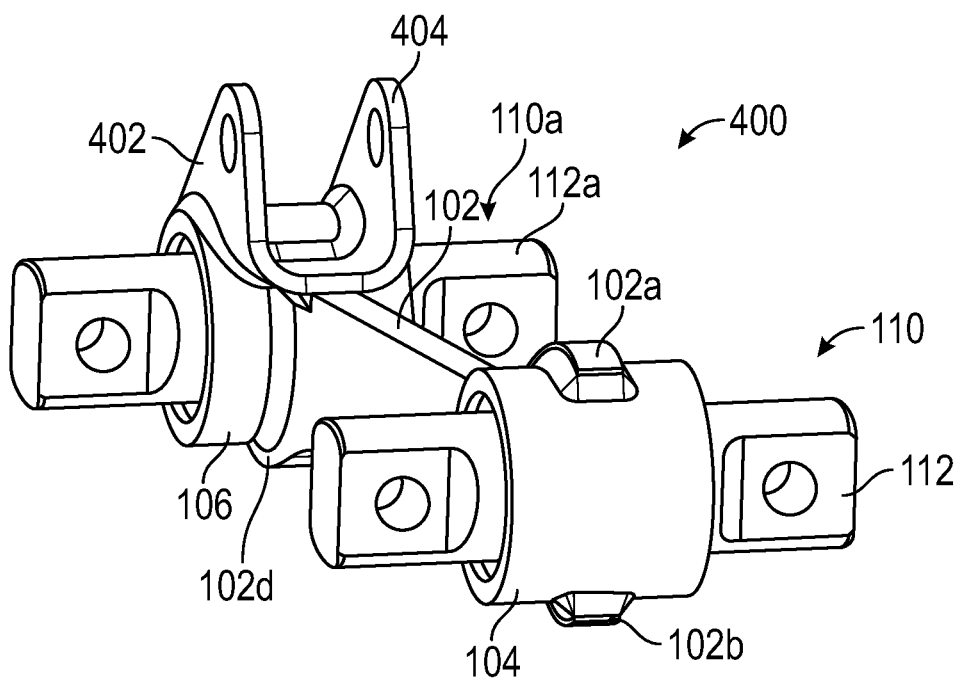
FIG. 18 is a perspective view of torque rod 400 having a bracket with mounting flanges 402 and 404 welded to bushing hub 106.

FIG. 18 is a perspective view of torque rod 400 having a bracket with mounting flanges 402 and 404 welded to bushing hub 106. Torque rod 400 has the same configuration as torque rod 100 shown in FIGS. 1-8 including rod portion 102, bushing hubs 104 and 106, and fingers 102a, 102b, and 102d, but does not include a finger welded to the top of hub 106. Instead a mounting bracket having mounting flanges 402 and 404 is welded to hub 106. The mounting flanges 402 and 404 may be used to mount a shock absorber or other suspension component.

FIG. 19A is a side view of torque rod 1000, including a rod 1002 extending between fingers 1002a-b and fingers 1002c-d. A bushing hub 1004 is positioned within fingers 1002a and 1002b and a bushing hub 1006, and a bushing hub 1006 is positioned within fingers 1002c and 1002d. Rod 1002 may be used in place of rods 102, 102', 102" in torque rods 100, 100', and 100" described above. FIG. 19B is a cross-sectional view of torque rod 1000 taken along lines 19B-19B in FIG. 19A. As seen in FIG. 19B, the first side 1003, or lower surface, of rod 1002 in FIG. 19B may be deformed by a stamping process, forming process, or coining process, collective "coining process" forming a "coined" rod. The coining process imparts greater strength to the rod 1002 to improve anti-buckling characteristics to the rod 1002, when the rod 1002 is in compression.

FIG. 19C is a cross-section view of torque rod 1000 taken along lines 19C-19C in FIG. 19A. As shown in FIG. 19C, as a result of the coining process, first side 1003 of rod 1002 has a curved surface, and the second side 1003a of rod 1002 also has a curved surface.

Figure 20:
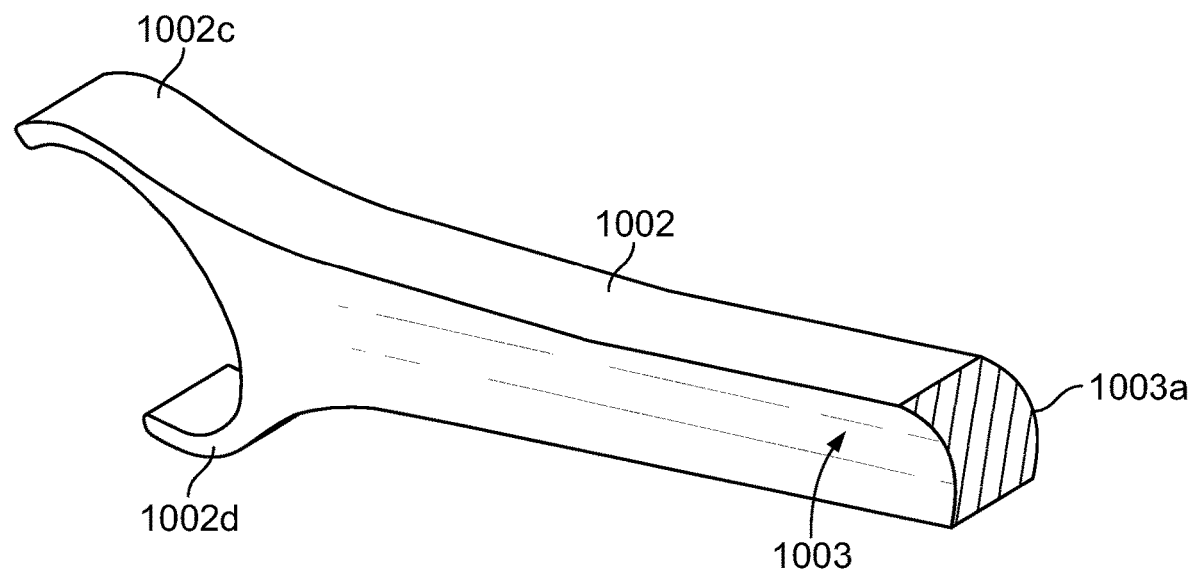
FIG. 20 is a perspective view of a portion of rod 1002 of torque rod 1000 shown in FIGS. 19A-C.

FIG. 20 is a perspective view of a portion of rod 1002 of torque rod 1000 shown in FIGS. 19A-C. As shown in FIG. 20, as a result of the coining process, first side 1003 of rod 1002 has a curved surface, and the second side 1003a of rod 1002 also has a curved surface.

Figure 21:
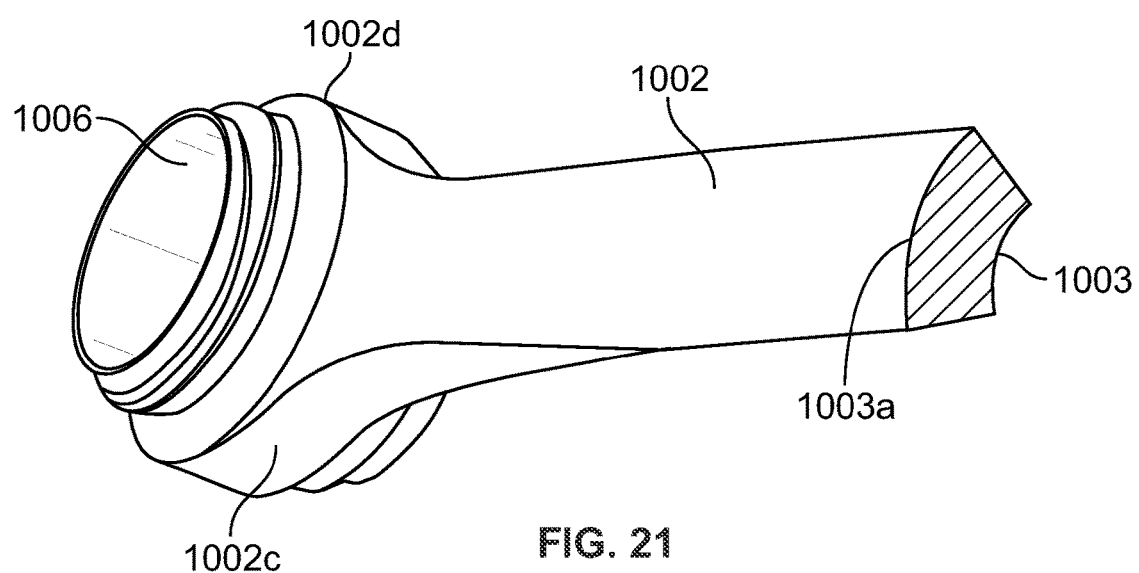
FIG. 21 is a perspective view of a portion rod 1002 of torque rod 1000 shown in FIGS. 19A-C including bushing hub 1006.

FIG. 21 is a perspective view of a portion rod 1002 of torque rod 1000 shown in FIGS. 19A-C including bushing hub 1006 positioned within fingers 1002c and 1002d. As shown in FIG. 21, as a result of the coining process, first side 1003 of rod 1002 has a curved surface, and the second side 1003a of rod 1002 also has a curved surface.

The present embodiments are illustrated showing a single control rod. However, in some suspensions a V-rod attachment is used. The V-rod attachment could include rods constructed in the same or similar manner to torque rods 100, 100', and 100" set forth in the Figures. In particular, the rods in the V-rod attachment are cut from plate or sheet steel and bushing hubs formed of cut tubing are welded to an end of the rods, and fingers of the rods could extend over and be welded to the bushing hubs.

Example embodiments of the present invention have been described above. Those skilled in the art will understand that changes and modifications may be made to the described embodiments without departing from the true scope of the present invention, which is defined by the claims.

What is claimed is:

1. A fabricated torque arm for use in a vehicle suspension, the fabricated torque arm comprising:
   a rod comprising a single piece of metal cut from a metal plate or sheet, the rod having a solid rectangular cross-section, and the rod having a first end of the rod, a second end of the rod, and a central portion of the rod between the first end of the rod and the second end of the rod; and
   a first bushing hub, wherein:
      the first bushing hub comprises cut tubing,
      the first end of the rod has a radius that conforms to an outer surface of the first bushing hub;
      the first end of the rod includes first and second fingers,
      a portion of the first bushing hub is disposed between the first and second fingers,
      the first and second fingers extend longitudinally more than halfway around the outer surface of the first bushing hub without encircling the first bushing hub, and
      the first end of the rod is welded to the outer surface of the first bushing hub.

2. The fabricated torque arm of claim 1, further comprising:
   a second bushing hub;
   wherein the second bushing hub comprises cut tubing;
   wherein the second end of the rod has a radius that conforms to an outer surface of the second bushing hub; and
   wherein the second end of the rod is welded to the outer surface of the second bushing hub.

3. The fabricated torque arm of claim 2,
   wherein the first and second fingers are welded to the first bushing hub,
   wherein the second end of the rod includes first and second fingers that extend more than halfway around the outer surface of the second bushing hub, and
   wherein the first and second fingers of the second end of the rod are welded to the second bushing hub.

4. The fabricated torque arm of claim 3, wherein the first and second fingers of the second end of the rod completely encircle the second bushing hub.

5. The fabricated torque arm of claim 2, wherein the second end of the rod extends more than halfway around the outer surface of the second bushing hub.

6. The fabricated torque arm of claim 2, wherein a first mounting flange is welded to the first bushing hub and a second mounting flange is welded to the second bushing hub.

7. The fabricated torque arm of claim 2,
wherein the first bushing hub has a first end and a second end disposed opposite the first end, and the first and second ends of the first bushing hub have a reduced wall thickness relative to a wall thickness of a central portion of the first bushing hub positioned between the first and second ends of the first bushing hub, and
wherein the first and second ends of the first bushing hub are adapted to be curled over opposite ends of a first bushing assembly positioned within the first bushing hub to retain the first bushing assembly within the first bushing hub.

8. The fabricated torque arm of claim 7,
wherein the second bushing hub has a first end and a second end disposed opposite the first end, and the first and second ends of the second bushing hub have a reduced wall thickness relative to a wall thickness of a central portion of the second bushing hub positioned between the first and second ends of the second bushing hub, and
wherein the first and second ends of the second bushing hub are adapted to be curled over opposite ends of a second bushing assembly positioned within the second bushing hub to retain the second bushing assembly within the second bushing hub.

9. The fabricated torque arm of claim 1,
wherein the rod comprises a first rod,
wherein the fabricated torque arm further comprises:
  a second rod comprising a single piece of metal cut from a metal plate or sheet, the second rod having a solid rectangular cross-section, and the second rod having a first end of the second rod, a second end of the second rod, and a central portion of the second rod between the first end of the second rod and the second end of the second rod; and
  a second bushing hub positioned within the first end of the second rod,
  wherein the first end of the second rod at least partially encircles an outer surface of the second bushing hub,
  wherein the second bushing hub is welded to the first end of the second rod,
  wherein the second end of the first rod extends towards and is secured to a vertex of a V-rod attachment, and
  wherein the second end of the second rod extends towards and is secured to the vertex of the V-rod attachment.

10. A method of fabricating components of a torque arm, the method comprising:
cutting, from a metal plate or sheet, a single piece of metal to form a rod, wherein:
  the rod has a solid rectangular cross-section, and
  the rod has a first end of the rod, a second end of the rod, and a central portion of the rod between the first end of the rod and the second end of the rod;
cutting a tube to form a first bushing hub, wherein:
  the first end of the rod has a radius that conforms to an outer surface of the first bushing hub,
  the first end of the rod includes first and second fingers,
  a portion of the first bushing hub is disposed between the first and second fingers,
  the first and second fingers extend longitudinally more than halfway around the outer surface of the first bushing hub without encircling the first bushing hub; and
welding the first end of the rod to the outer surface of the first bushing hub, wherein the first end of the rod is welded to the outer surface of the first bushing hub.

11. The method of claim 10, further including:
cutting the tube to form a second bushing hub; and
welding the second end of the rod to the second bushing hub.

12. The method of claim 11, wherein the second end of the rod extends more than halfway around the outer surface of the second bushing hub.

13. The method of claim 10, further comprising:
coining the central portion of the rod to form a curved upper surface of the central portion of the rod and a curved lower surface of the central portion of the rod.

14. The method of claim 13, wherein coining the central portion of the rod occurs before welding the first end of the rod to the outer surface of the first bushing hub.

* * * * *